A. GRIEVES.
MOWING MACHINE.
APPLICATION FILED DEC. 19, 1913.
1,113,552.
Patented Oct. 13, 1914.
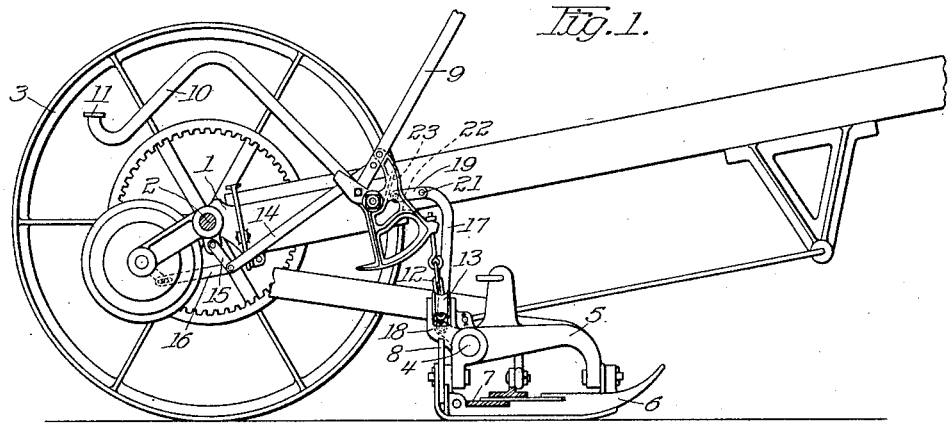
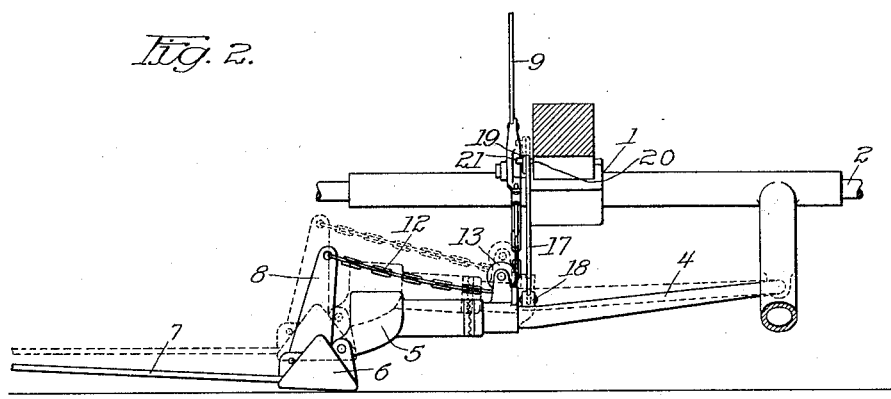
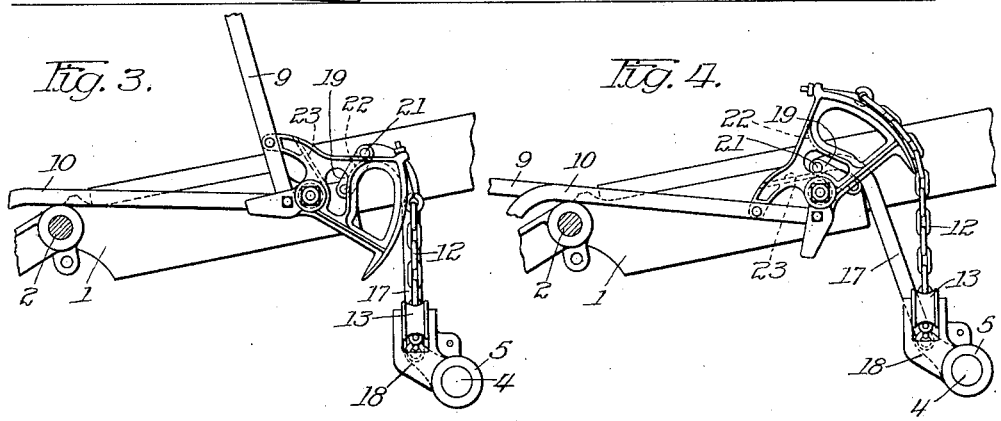
Witnesses:
Inventor:
Albert Grieves.
by Chas. E. Lord Atty.

UNITED STATES PATENT OFFICE.

ALBERT GRIEVES, OF SPRINGFIELD, OHIO, ASSIGNOR TO INTERNATIONAL HARVESTER COMPANY OF NEW JERSEY, A CORPORATION OF NEW JERSEY.

MOWING-MACHINE.

1,113,552.   Specification of Letters Patent.   Patented Oct. 13, 1914.

Application filed December 19, 1913. Serial No. 807,616.

*To all whom it may concern:*

Be it known that I, ALBERT GRIEVES, a citizen of the United States, residing at Springfield, in the county of Clark and State of Ohio, have invented certain new and useful Improvements in Mowing-Machines, of which the following is a full, clear, and exact specification.

My invention relates to mowing machines, and particularly to the mechanism for adjusting the cutting apparatus to a higher or lower plane in that class of such machines wherein the finger bar is hinge-jointed to a coupling frame which is pivotally connected with the main frame of the machine in a manner to rise and fall in following the inequalities of the surface of the ground, and wherein the finger bar is designed to be adjusted from a horizontal or operative position to a substantially vertical one by means of a common form of hand lever mounted upon the frame of the machine and connected with the coupling frame, the finger bar having flexible connections therewith in any of the usual ways.

It is usual in the above type of machines to provide a connection controlled by the hand lever for adjusting the cutting apparatus and the clutch mechanism forming part of the power transmitting means, whereby action of the latter is suspended when the finger bar has reached a degree of elevation rendering any further operation of the cutting mechanism impractical. In such a construction, however, it has been found that in lowering the finger bar to operative position by allowing the hand lever to move forward, the finger bar was still left at an excessive angle and the clutch mechanism was operatively engaged, the result being the locking of the gear mechanism and destruction of parts.

The object of my invention is to provide improved means whereby, when the hand lever is moved forward for the purpose of allowing the finger bar to move from a vertical toward a horizontal position and the clutch mechanism to engage operatively, the coupling frame is locked from descending until the finger bar has assumed an angle making it safe to allow the cutting apparatus to be operatively connected with the power transmitting mechanism.

A further object of this invention is to provide means whereby the locking mechanism is positively controlled by the finger bar adjusting mechanism.

I attain these objects by the provision of improved controlling mechanism for the coupling frame comprising a locking toggle and a toggle controlling cam operative upon movement of the operating lever, as hereinafter more fully set forth.

In order that my invention may be fully and completely disclosed, I have illustrated in the accompanying drawings one embodiment which the same may assume in practice.

Figure 1 is a side elevation of part of a mower having my invention embodied in its construction; Fig. 2 is a front elevation of part of Fig. 1; Fig. 3 is a side elevation of part of the main frame of a mower and the finger bar adjusting and controlling mechanism, showing the coupling frame in a raised position and the locking mechanism engaging with the hand lever; and Fig. 4 is a similar view showing the locking mechanism as moved to its holding or locking position.

Referring to the drawings, wherein the same reference characters denote the same parts throughout the several views, 1 represents the main frame of the machine, 2 the driving axle journaled thereon, 3 one of the traction wheels, 4 a coupling frame having its stubbleward end pivotally connected with the main frame, 5 a coupling yoke carried by the grassward end of the coupling frame and permitted to rock axially thereon, 6 a shoe pivotally connected with the yoke 5, and 7 a finger bar secured to the shoe, the pivotal connection of the shoe with the yoke permitting the finger bar to be swung in a vertical plane from a horizontal and operative position to substantially a vertical one.

8 represents a vertically disposed arm secured to the shoe 6, and 9 a hand lever pivotally mounted upon the main frame 1 and including the usual curved arm 10 and foot lever attachment 11; the lever being connected with the arm 8 by means of a chain 12 that passes under a sheave 13 carried by the coupling frame 4.

14 represents a clutch shipping bar having its front end pivotally connected with the hand lever and its rear end operatively connected with a clutch shipping mechanism, as by means of a rocking arm 15 and link 16, whereby, when the finger bar has been raised to a predetermined angle, the clutch mechanism, forming part of the power transmitting mechanism between the traction wheels and the cutting apparatus, is automatically disengaged and is not permitted to reëngage until the finger bar has been lowered to a practical operative position. In order to insure full efficiency of this part of the mechanism, I provide means for locking the coupling frame against a downward movement until the finger bar has reached a substantially horizontal position, the means including a link member 17 having its lower end pivotally connected with a bracket member 18 secured to the coupling frame, the sheave 13 being mounted in the bracket. The upper end of the link 17 is curved rearward and pivotally connected with the upper end of a short swinging link 19 by means of a pin 20, having a laterally projecting head 21; the lower end of the link 19 being pivotally connected with the main frame 1 eccentric to the axis of the hand lever 9.

Integral with the hand lever mechanism is a cam track 22 and a rib member 23 that engage with the head 21 of the pin 20. The cam track 22 is engaged by this pin when the hand lever is turned rearward to raise the coupling frame and finger bar and causes the link 19 to swing rearward, carrying with it the upper end of the link 17, until the hand lever has reached its rearmost position with the axis of the pivotal connection of the links 17 and 19 in rear of a line drawn through the axis of link 17 upon the coupling frame and the axis of the link 19 upon the main frame, the mechanism becoming self-locking as a toggle connection between the coupling frame 4 and main frame 1 and operative to secure the coupling frame in a raised position until the hand lever has been moved forward, permitting the finger bar to swing outward and downward to an operative position. When the finger bar has reached an operative position the rib member 23 engages the head 21 of pin 20 in a manner to swing the links 19 and 17 forward until the lock is broken and the coupling frame permitted to descend, the cam 22 preventing any premature unlocking of the toggle until the hand lever has been moved forward to a predetermined angle and the position of the links 17 and 19 being wholly controlled by the hand lever mechanism when moved in either direction.

Having illustrated and described a preferred form of my invention, it is to be understood that I do not wish to be confined to the particular details of construction shown for purposes of illustration, as many minor changes may be made in the construction shown without departing from the spirit of my invention.

What I claim as my invention, and desire to secure by Letters Patent, is:

1. In a mowing machine, a main frame, a coupling frame adjustably connected therewith, a lever carried by said main frame, a toggle connection between said coupling frame and said main frame automatically locking said coupling frame in a predetermined position of adjustment, and means carried by said lever and operative during a movement in one direction thereof to retain said toggle connection in locking position.

2. In a mowing machine, a main frame, a coupling frame pivotally connected therewith, a lever pivotally mounted upon said main frame and connected with said coupling frame, a toggle mechanism between said main frame and said coupling frame, and a cam carried by said lever and operative to move said toggle mechanism into locking position when said lever is moved in one direction and to retain said toggle mechanism in locking position during an initial part of the reverse movement of said lever.

3. In a mowing machine, a main frame, a coupling frame pivotally connected therewith, a lever pivoted on said main frame and operatively connected with said coupling frame, toggle mechanism intermediate said main frame and said coupling frame and operative to lock said coupling frame in an elevated position at a predetermined position of adjustment of said lever in one direction, and a cam carried by said lever and operative to move said toggle mechanism into locking position and to hold it therein during a part of the movement of said lever in the reverse direction.

4. In a mowing machine, a main frame, a coupling frame pivotally connected therewith, a lever pivotally mounted upon said main frame and connected with said coupling frame, a toggle mechanism between said main frame and said coupling frame, a cam carried by said lever and operative to move said toggle mechanism in locking position when said lever is moved in one direction and to retain said toggle mechanism in locking position during an initial part of the reverse movement of said lever, and means carried by said lever and operative to unlock said toggle mechanism during the remainder of the reverse movement of said lever.

5. In a mowing machine, a main frame, a coupling frame pivotally connected therewith, a finger bar pivotally connected with said coupling frame, a lever pivotally mounted on said main frame, flexible connections between said lever and said coupling frame and finger bar operative to raise said coupling frame and said finger bar during an initial movement of said lever, toggle mechanism between said coupling frame and said main frame adapted to sustain said coupling frame in a raised position, a cam carried by said lever and operative to move said toggle mechanism into a locking position during an initial movement of said lever to raise said coupling frame and finger bar and to retain said toggle mechanism in a locking position during an initial movement of said lever in the reverse direction.

In testimony whereof I affix my signature, in the presence of two witnesses.

ALBERT GRIEVES.

Witnesses:
R. M. HOLLENBECK,
M. M. MORROW.

Copies of this patent may be obtained for five cents each, by addressing the "Commissioner of Patents, Washington, D. C."